United States Patent [19]

Clark et al.

[11] 4,042,097
[45] Aug. 16, 1977

[54] STORAGE SYSTEM

[75] Inventors: Leonard R. Clark, Oreland; David W. Meehl, Hatboro, both of Pa.

[73] Assignee: Standard Pressed Steel Co., Jenkintown, Pa.

[21] Appl. No.: 668,371

[22] Filed: Mar. 19, 1976

[51] Int. Cl.² ............................ A47F 5/14; A47F 5/00
[52] U.S. Cl. .................................... 211/182; 29/21.1; 29/513; 211/183; 248/243
[58] Field of Search ................... 29/155 R, 513, 21.1; 211/182, 183, 191; 108/109; 248/235, 243

[56] References Cited

U.S. PATENT DOCUMENTS

| | | | |
|---|---|---|---|
| 2,776,030 | 1/1957 | Bush | 211/182 UX |
| 2,871,556 | 2/1959 | Chisholm | 29/513 |
| 2,967,337 | 1/1961 | Hedrick | 29/513 X |
| 3,031,088 | 4/1962 | Ribbens et al. | 211/182 X |
| 3,102,641 | 9/1963 | Konstant et al. | 211/191 |
| 3,112,034 | 11/1963 | Kaufman et al. | 211/191 |
| 3,286,416 | 11/1966 | Ashworth | 29/513 X |
| 3,862,691 | 1/1975 | Mori et al. | 211/191 |

*Primary Examiner*—Charlie T. Moon
*Attorney, Agent, or Firm*—Andrew L. Ney; Aaron Nerenberg

[57] ABSTRACT

A storage system in accordance with the preferred embodiment of the invention includes a support member formed with a first leg providing a track surface and a second leg extending at a generally right angle thereto and providing a guide surface. The second leg member is formed with a plurality of connecting means, one at each end of the support member, for securing the support member to adjacent support posts. The connecting means includes a hook member formed on the second leg and a tab member also formed on the second leg and forming an angle greater than 90° with the portion of the second leg located between the hook member and the tab member. To assemble the storage system, the hook members are first engaged with slots in an adjacent pair of posts and the support member is then rotated so that the tab members pass into other slots in the post members. Thereafter, each of the tab members is bent toward the hook member so that it forms an angle less than 90° with the portion of the second leg between the tab member and the hook member and so that it underlies the portion of the associated post between the slots whereby the support member is securely retained on the post members.

12 Claims, 5 Drawing Figures

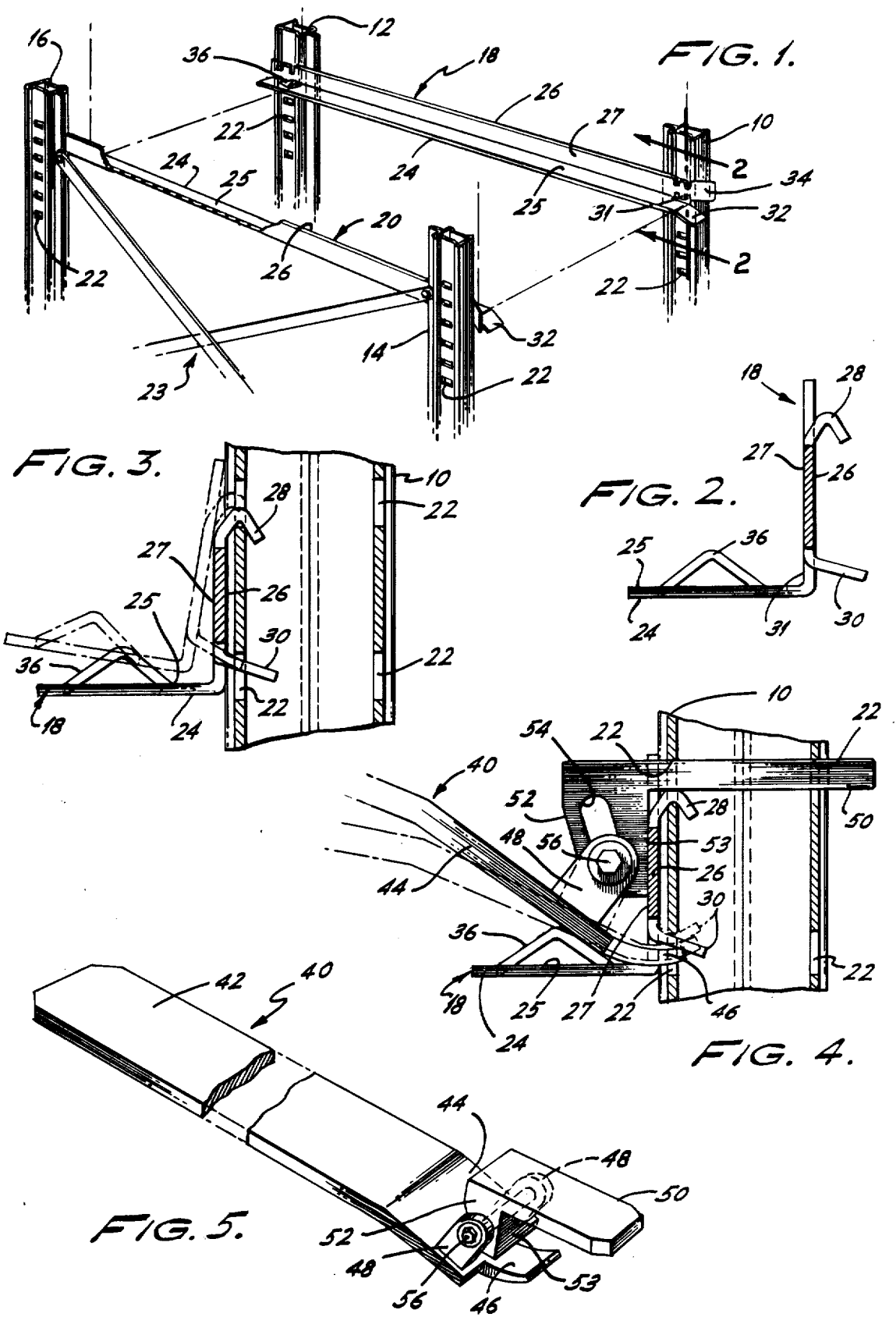

STORAGE SYSTEM

This invention relates to storage systems and, more particularly, to storage systems including a track-like supportng member and a vertical post system.

In various storage systems, it is desirable to connect the actual support members to a system of vertical support posts in a generally permanent manner so that ease of assembly or disassembly is not a particular requirement of the system. For example, in storage systems of the type used with automated retrieval apparatus, support members are utilized which provide a track along which storage containers can slide during their insertion or removal from a storage space and which function to support the storage containers in the storage space after their insertion. Usually, the retrieval apparatus is arranged to slide along a generally fixed path so that disassembly of the storage system is not a necessary requirement of the storage system.

In storage systems of the type noted, easy connection and disconnection means could be utilized to secure the support members to the vertical support posts, but it is noted that the automatic retrieval apparatus or a storage container could hit the storage system during insertion or removal and inadvertently disconnect the support members. Thus, it is usual to connect the support members to the support post by using various positive interlocking fastener assemblies. Some of the more commonly used fastener assemblies include nut and bolt combinations, expandable plug members and blind rivets. While these noted assemblies function in a generally satisfactory manner, excessive manipulation is required when assembling the storage system so that it is a relatively time consuming and expensive procedure.

Accordingly, it is an object of this invention to provide a storage system including support members and support posts which are relatively easy and economical to assemble.

It is another object of this invention to provide support track members that can be positively connected to a support post system without the use of time consuming fastener assemblies.

It is yet another object of this invention to provide a method of assembling a storage system which is relatively easy and inexpensive.

Finally, it is an object of this invention to provide a track member usable to support storage containers such that the insertion of the storage containers on the track member is facilitated and which is adapted for use with automatic retrieval apparatus.

These and other objects of this invention are accomplished by providing a support member and a vertical post system for carrying the support members. The support member is in the form of an elongated member including a first leg and a second leg extending at a generally right angle to the first leg. One surface of the first leg provides a track surface along which storage containers can slide and on which the containers can be supported and one surface of the second leg provides a guide surface for the storage container as it slides along the track surface. The second leg is formed with first connection means adjacent one end thereof and second connection means adjacent the other end thereof and each of the connection means includes a hook member and a tab member. The hook member is located adjacent the free edge of the second leg and the tab member is aligned with the hook member and is located adjacent the intersection of the first and second legs. Initially the tab member forms an angle greater than 90° with that portion of the second leg located between the hook member and the tab member and the tab member is bendable about its line of intersection with the second leg to form an angle of less than 90° with the noted portion of the second leg.

To assemble the system, the support posts which have previously been formed with aligned slots extending axially along the post are arranged in a desired position and supported in a vertical position. The hook members are first inserted into engagement with adjacent slots formed on adjacent support posts so that they underlie the outersurface of the posts and are then rotated so that the tab members are inserted into other adjacent slots in adjacent support posts. Because of the angular relationship of the tab member to the second leg of the support member, the insertion of the tab members into the slots is facilitated. Thereafter, a bending force is applied to the tab members to bend each tab member into a position wherein it forms an angle less than 90° with the portion of the guide surface between the hook member and the tab member and so that the tab members also underlie the outer surface of the posts. Thus, the support member is securely retained on the support posts.

Preferably, both the support surface and the guide surface are inclined at one end of the support member so that insertion of storage containers is facilitated. In addition, the support member is preferably formed with a stop means adjacent the other end so that the container cannot be inserted beyond the storage space formed by the support members.

For a better understanding of the invention, reference is made to the following description of a preferred embodiment thereof taken in conjunction with the figures of the accompanying drawing, in which:

FIG. 1 is a perspective view of an assembled storage system in accordance with this invention;

FIG. 2 is a sectional view taken along line 2—2 of FIG. 1 and illustrating one of the support members;

FIGS. 3 and 4 are sectional views illustrating various steps in the method of assembling a support member to a support post in accordance with this invention; and, FIG. 5 is a perspective view of a tool usable to assemble a storage system in accordance with this invention.

Referring now to FIG. 1 of the drawing, a preferred embodiment of the invention is illustrated which is particularly adaptable to slidingly receive and thereafter support storage containers (shown in phantom lines in FIG. 1) and which is particularly useful with automatic retrieval and insertion apparatus. Included is a plurality of generally vertical support posts 10, 12, 14 and 16 arranged in a pattern such that they are located at the corners of an imaginary rectangle. Across a first pair of posts, 10 and 12, is a first support member 18 and across a second pair of posts, 14 and 16, is a second support member 20. As will be made clear hereinafter, the support members 18 and 20 are arranged on the support posts to provide tracks along which storage containers may slide and on which the storage containers are supported. It should be understood however, that in certain embodiments of the invention a support member in the form of a shelf could be utilized in place of the track arrangement.

All of the support posts 10, 12, 14 and 16 are generally the same and are formed along at least one face thereof with a plurality of slots 22 such that the slots on any post are vertically aligned and such that the slots on adjacent posts are horizontally aligned. Preferably, opposite faces of each post are formed with slots to obviate orientation problems during assembly and also to allow one pair of posts to support a pair of support members, one such member being supported on opposite faces of the post. The cross-sectional shape of the support posts may be any desired configuration and cross braces 23 may be used to add rigidity to the assembled system. It should be understood that any desired bracing arrangement can be utilized.

The support members 18 and 20 are generally the same except that one is a mirror image of the other. Each support member is generally elongated and has an L-shaped cross-sectional configuration. Thus, each support member includes a first leg 24 and a second leg 26 forming a generally right angle with the first leg. The first leg 24 extends only a relatively short distance from the second leg 26 and the upper surface 25, as viewed in the drawing, provides a track surface over which storage containers can slide and on which the storage containers are supported. The second leg 26 also extends only a relatively short distance from the first leg 24 and provides a surface 27 that guides the storage containers on the track surface 25 during the insertion and removal procedures. The interior surfaces, that is surfaces 25 and 27 of each support member 18 and 20 and provide a storage space for the containers. The surface of second leg 26 opposite guide surface 27 is formed with first and second connecting means, one at each end of a support member, which connect each support member to a pair of vertical support posts. Briefly, the connecting means are in the form of a hook member 28 and a tab member 30.

Adjacent one end, the leg 24 of each support member is formed with an inclined surface 32 extending in a direction opposite that of leg 26 and the leg 26 is formed with an inclined surface 34 extending in a direction opposite that of leg 24. That is, the inclined surfaces 32 and 34 extend away from the storage space defined by the support members 18 and 20. In use, the inclined portions 32 and 34 facilitate insertion of the storage containers onto the track surface 25 and this is particularly useful with automatic retrieval systems where misalignment of the storage container and the track surfaces can occur. In addition, a stop means 36 is provided at the other end of the support members 18 and 20 to limit movement of the storage container so that it cannot be inserted beyond the storage space when it is inserted on the track surfaces. In the preferred embodiment of the invention illustrated herein, the stop means 36 is formed on the track surface 25 of the leg 24 and is formed by material struck upwardly from the leg 24 into the path of a storage container on the track surface.

The connecting means are generally the same and, accordingly, only one will be particularly described. Each hook member 28 is struck out from the second leg 26 adjacent the free edge thereof and extends in a direction opposite that of leg 24. The hook member can be any generally conventional configuration which can be inserted through a slot 22 and underlie the outer surface of a support post. The tab member 30 is spaced from the hook member 28 a distance generally equal to the distance between adjacent slots 22 on the support posts and is located adjacent the line of intersection of the two leg members 24 and 26. Preferably both the hook member 28 and the tab member 30 are struck out from the second leg 26 and are of a width slightly less than that of the width of the slots 22 so as to be received therein. The tab member 30 is bendable about its line of connection with the second leg 26 and initially forms on angle greater than 90° with that portion of the second leg 26 between the hook member 28 and the tab member. Preferably, the tab member forms an angle of 105° with the noted portion of the second leg. As will be made clear hereinafter, use of an angle greater than 90° permits insertion of the tab member into a slot 22 on a support post after the hook member 28 has been engaged with an adjacent slot on the support post. In addition, it should be noted that the tab member after insertion into a slot 22 is bent back toward the hook member until it forms an angle less than 90° with the portion of the second leg 26 located between the hook member 28 and the tab member 30. After bending, the tab member 30 underlies the outer surface of the support post as clearly seen in FIG. 4 and, thus, the support member is securely connected to the support post. To allow insertion of a prying tool for applying the bending force an access slot 31 is formed adjacent the tab member 30.

As noted bending of the tab member 30 can be accomplished by any suitable prying tool, for example, by an elongated rigid tool inserted through the slot 22 in which the tab member is received and then by applying force to the projecting end of the tool which bends the tab member back toward the hook. Before explaining the method of attachment, reference is made to FIG. 5 of the drawing wherein a tool 40 particularly useful in bending the tab member is illustrated, but which forms no part of this invention. The tool 40 includes an elongated member having a handle portion 42 at one end, an inclined portion 44 extending therefrom and an arcuate finger 46 for bending the tab member 30. As clearly seen in the drawing, the finger 46 has a reduced width relative to that of the handle portion 42 and the inclined portion 44 and is of a width such that it fits in the slots 22 on the support posts. A pair of lugs 48, 48 are formed on the inclined portion 44 and pivotally carry a reaction finger 50 having planar top and bottom surfaces and also having a width to fit in the slots 22. The finger 50 is formed with a transversely extending ear portion 52 fitting between lugs 48, 48 and is formed with an elongated slot 54 which receives a pin 56 extending through the lugs to provide the pivoted connection between the second finger and the elongated member. The interior surface 53 of the ear 52 is formed with a planar surface for a purpose to be explained hereinafter. As clearly seen in both FIGS. 4 and 5 of the drawing, the finger 50 extends farther in the axial direction of the tool than does the finger 46, that is, the finger 50 extends beyond the finger 46. Preferably the second finger 50 extends a distance such that it fits across adjcent slots 22 formed in opposite faces of a support post. The fingers 46 and 50 are spaced apart a distance generally equal to the distance between adjacent slots 22 formed on the same face of a support post and also the distance between the hook member 28 and the tab member 30 of any connecting means.

To assemble the support system, the posts 10, 12, 14 and 16 are arranged with their longitudinal axes in vertical positions such that the slots 22 on each post are in vertical alignment and such that the slots on posts 10 and 14 face each other and further such that the slots on posts 12 and 16 also face each other. In addition slots 22 on each post are horizontally aligned and the aligned slots form a generally horizontal plane. For purposes of this explanation the assembly of the support member 18 to the support posts 10 and 12 will be explained. The support member 18 is cocked on an angle relative to the support posts 10 and 12 and the hook members 28, 28 are inserted into horizontally aligned slots 22 as shown in phantom lines in FIG. 3. A portion of the hook members 28, 28 underlie the outer surface of the support posts 10 and 12. At this point, the support member 18 is rotated in a counter-clockwise direction as seen in FIG. 3 so that the tab members 30, 30 are inserted into horizontally aligned slots 22, 22 spaced below the slots in which the hook members 28, 28 are received as shown in solid in FIG. 3 of the drawing. Because the angle between the tab member and the portion of the second leg 26 extending between the hook 28 and the tab member is greater than 90°, insertion of the tab members 30, 30 is readily accomplished. At this point, the bending force is applied to the tab member 30 causing it to bend back toward the hook member forming an angle less than 90° with the portion of the leg member 26 between the hook member 28 and the tab member. The tab members 30, 30 now underlie the outer surface of the support posts 10 and 12 and cooperate with the hook members 28, 28 to securely retain the support member 18 to the support posts. The method is repeated for securing support member 20 to support posts 14 and 16.

If the tool 40 is utilized to bend the tab members, the reaction finger 50 is inserted in the slot 22 in which the hook member 28 is received and extends across the support post such that it bears on the top of the hook member and is received in an aligned slot 22 formed in the opposite face of the support post. The interior surface 53 of the ear 52 bears on the guide surface 27 of the second leg 26 and thus the second leg is held in place on the support post. The arcuate finger 46 is now inserted through the slot formed when the tab member is struck out and into the slot 22 in which the tab member 30 is received so that it bears on the outer surface of the tab member 30 as illustrated in FIG. 4 of the drawing. Force is now applied to the handle portion 42 causing the elongated member to pivot about the pin 56 such that the bending finger 46 which is curved toward the second finger 50 applies a bending force to the tab member 30. The bending force applied to the tab member 30 reacts through the second finger 50, the top of hook member 28 and the top edges of the slots 22, 22 in which the second finger is received.

If an elongated prying tool were used having only one finger, it should be understood that the prying finger would be inserted in the slot in which the tab member 30 is received and when the bending force is applied, would react on the track surface 25 and could cause the track surface to bend. Such bending would create problems during the insertion and removal of the storage containers and it is thus preferable to use the tool illustrated in FIG. 5 of the drawing.

While in the foregoing, a preferred embodiment of the invention has been described, it should be understood that various changes and modifications can be made without departing from the true spirit and scope of the invention as recited in the appended claims.

We claim:

1. An elongated support member having a generally L-shaped cross-sectional configuration including a first leg and a second leg forming a generally right angle with said first leg, said first leg providing a track surface over which a storage container may slide and on which a storage container may be supported and said second leg providing a guide surface for guiding storage containers sliding on said track surface, said second leg being formed with first connection means adjacent one end thereof and second connection means adjacent the other end thereof, said first and second connection means each including a hook member and an aligned tab member, said hook members being located adjacent the free edge of said second leg and said tab members being located adjacent the intersection of said first and second legs, said tab members forming an angle greater than 90° with the portions of said second leg between each pair of a hook member and a tab member whereby said hook members can be engaged in slots on support posts and the support member can be rotated so that the tab members are received in other slots on the support posts, said tab members being bendable about their juncture with said second leg to a position where they form an angle less than 90° with the portion of said second leg between each pair of a hook member and a tab member whereby said support member is securely retained on the post members.

2. An elongated support member in accordance with claim 1 wherein said first leg is formed with an inclined surface at one end for guiding storage containers onto said track surface.

3. An elongated support member in accordance with claim 1 wherein said second leg is formed with an inclined surface at one end for guiding storage containers onto said track surface.

4. An elongated support member in accordance with claim 1 including stop means adjacent one end thereof for limiting movement of a storage container on said track surface.

5. An elongated support member in accordance with claim 1 wherein access slots for receiving a prying tool are formed adjacent said tab member.

6. An elongated support member in accordance with claim 1 wherein one end of said first leg is formed with an inclined surface extending in a direction opposite that of said second leg and wherein said one end of said second leg is formed with an inclined surface extending in a direction opposite that of said first leg whereby said inclined surfaces facilitate the insertion of storage containers onto said track surface, said first leg being formed with stop means adjacent the other end thereof for limiting movement of storage containers, said elongated support members further including access slots formed adjacent said tab members for receiving a prying tool.

7. A storage system including a plurality of support posts extending in a generally vertical direction, each of said support posts being formed with a plurality of slots forming a row extending in a generally vertical direction, said slots being formed in at least one face of said support posts, support members extending between adjacent support posts in a pair forming a storage area in which storage containers can be supported, said support members including a first leg and a second leg forming a generally right angle with said first leg, said first legs providing track surfaces along which storage containers can slide and on which storage containers can be supported, said support surfaces extending at a generally right angle to the axis of said support posts, said second legs extending in a direction generally parallel to the axis of said support posts and providing guide surfaces for guiding storage containers sliding along said track surfaces, first connecting means formed on said support members adjacent one end thereof and second connecting means formed on said support members adjacent the other end thereof, said first and second connecting means securely retaining said support members on said pair of said support posts, each of said connecting means including a hook member and a tab member, said hook members being located adjacent the free edge of each of said second legs and said tab members being located adjacent the intersection of said first and second legs, said tab members forming an angle greater than 90° with the portion of said second legs between said hook members and said tab members whereby said hook members can be engaged in aligned slots on said pair of support posts and whereby said support members can be rotated such that said tab members are received in aligned slots on said pair of support posts, said tab members being bendable about a line where they join said second legs to a position forming an angle less than 90° with the portion of said second legs between said hook members and said tab members whereby a portion of said hook members and said tab members underlie the outer surfaces of their associated support post.

8. A storage system in accordance with claim 7 wherein said first legs are formed with inclined surfaces at one end for guiding storage containers onto said track surfaces.

9. A storage system in accordance with claim 7 wherein said second legs are formed with inclined surfaces at one end guiding storage containers onto said track surfaces.

10. A storage system in accordance with claim 7 wherein said support members include stop means adjacent one end thereof for limiting movement of storage containers on said track surfaces.

11. A storage system in accordance with claim 7 wherein access slots are formed adjacent said tab members for receiving prying tools.

12. A storage system in accordance with claim 7 wherein said first legs are formed with inclined surfaces extending in a direction opposite that of said second legs and wherein said second legs are formed with inclined surfaces extending in a direction opposite that of said first legs whereby said inclined surfaces facilitate the insertion of storage containers onto said track surfaces, said first legs being formed with stop means adjacent the other end thereof for limiting movement of said storage containers, said support members further including access slots adjacent said tab members for receiving a prying tool.

* * * * *